Aug. 10, 1965  J. ROGERSON ETAL  3,199,933
MACHINE BEARINGS
Filed Oct. 4, 1963  8 Sheets-Sheet 1
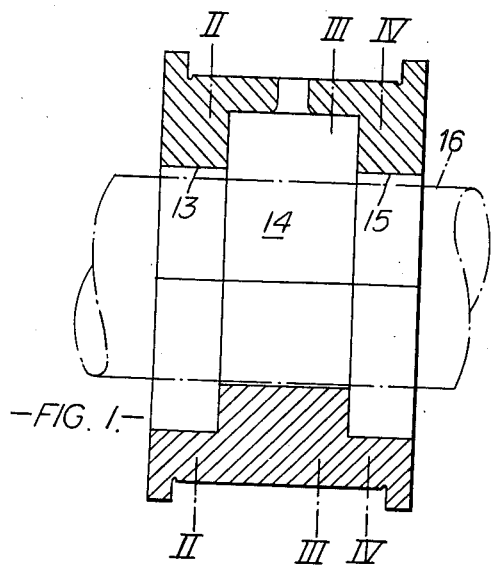
—FIG. 1.—
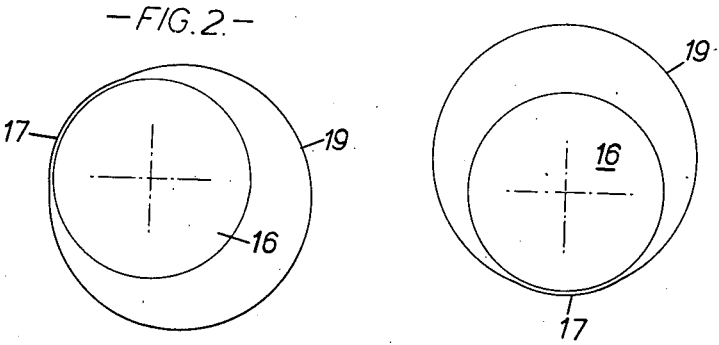
—FIG. 2.—  —FIG. 3.—
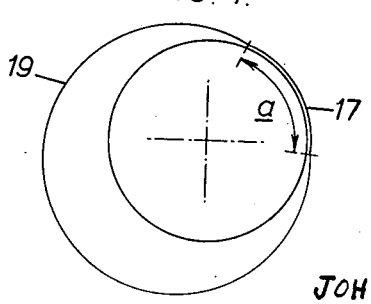
—FIG. 4.—
INVENTORS
JOHN ROGERSON
HAROLD C. WILDING
BY
ATTYS.

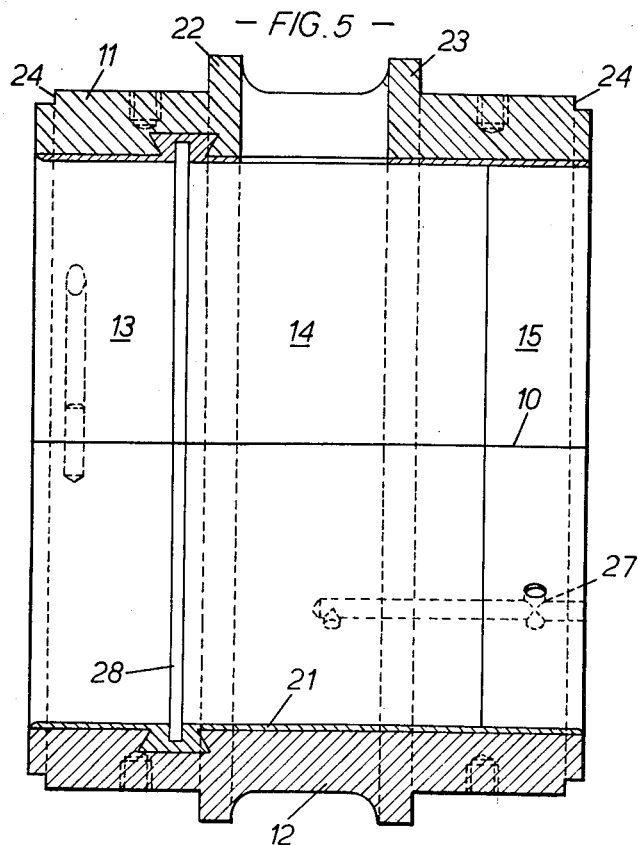

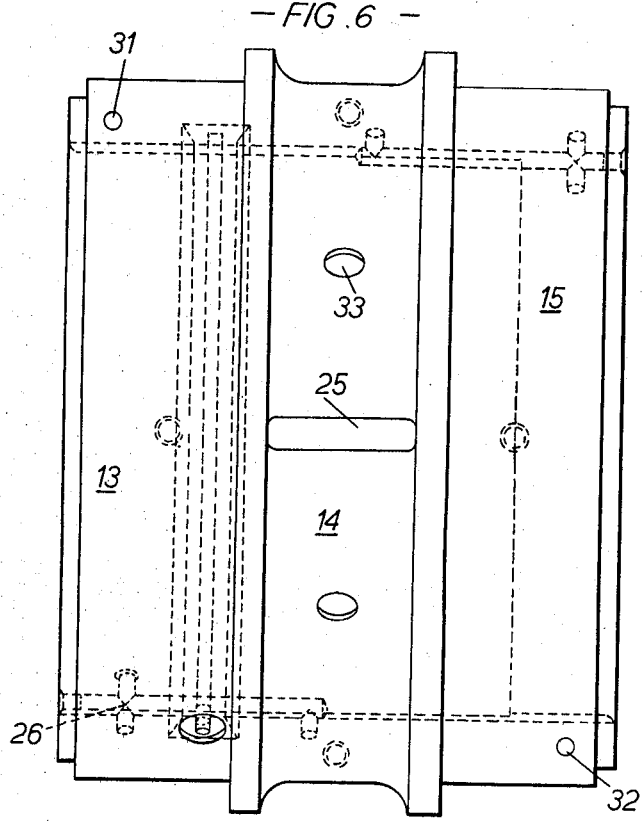

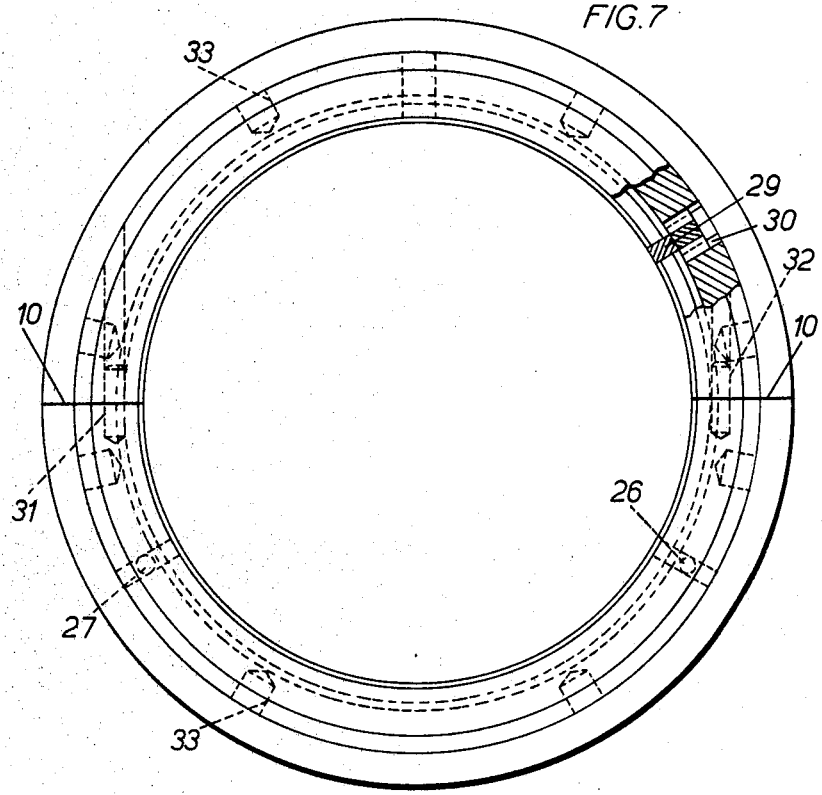
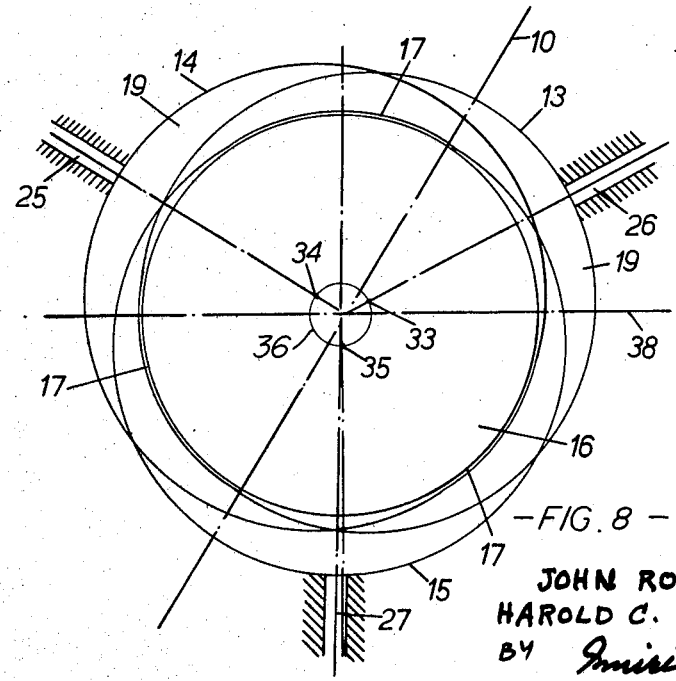

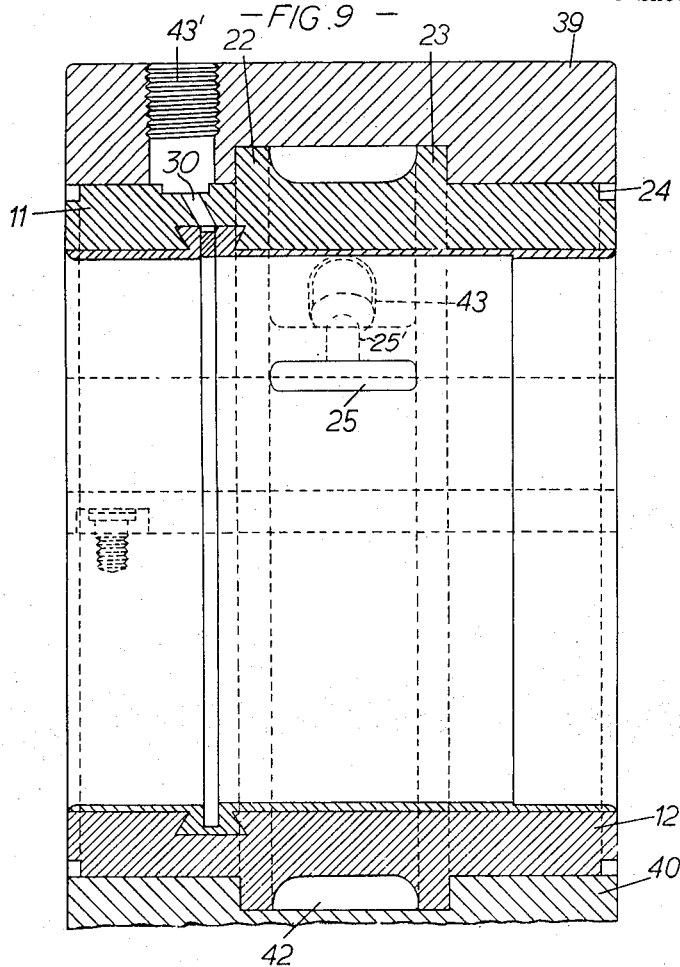

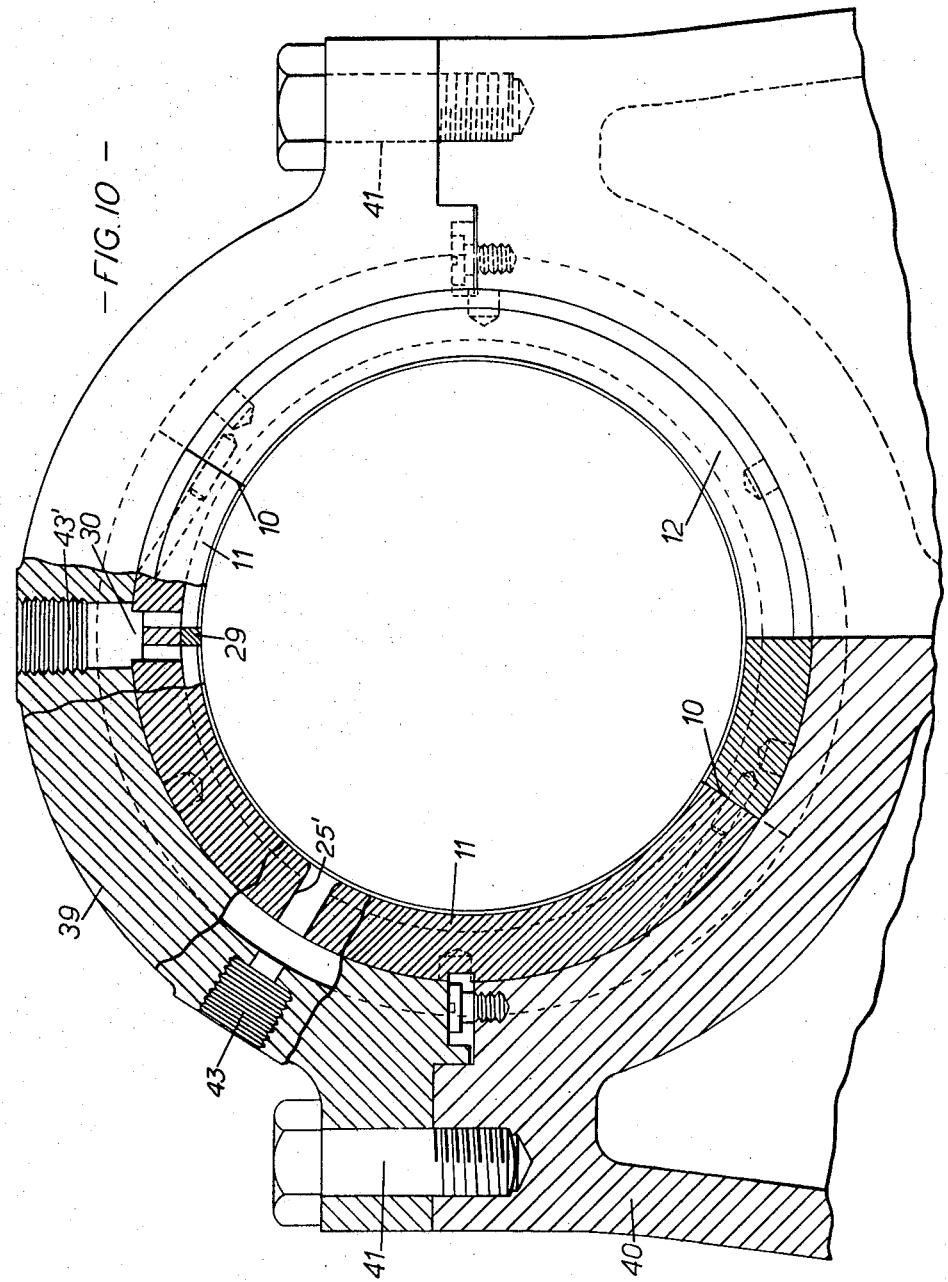

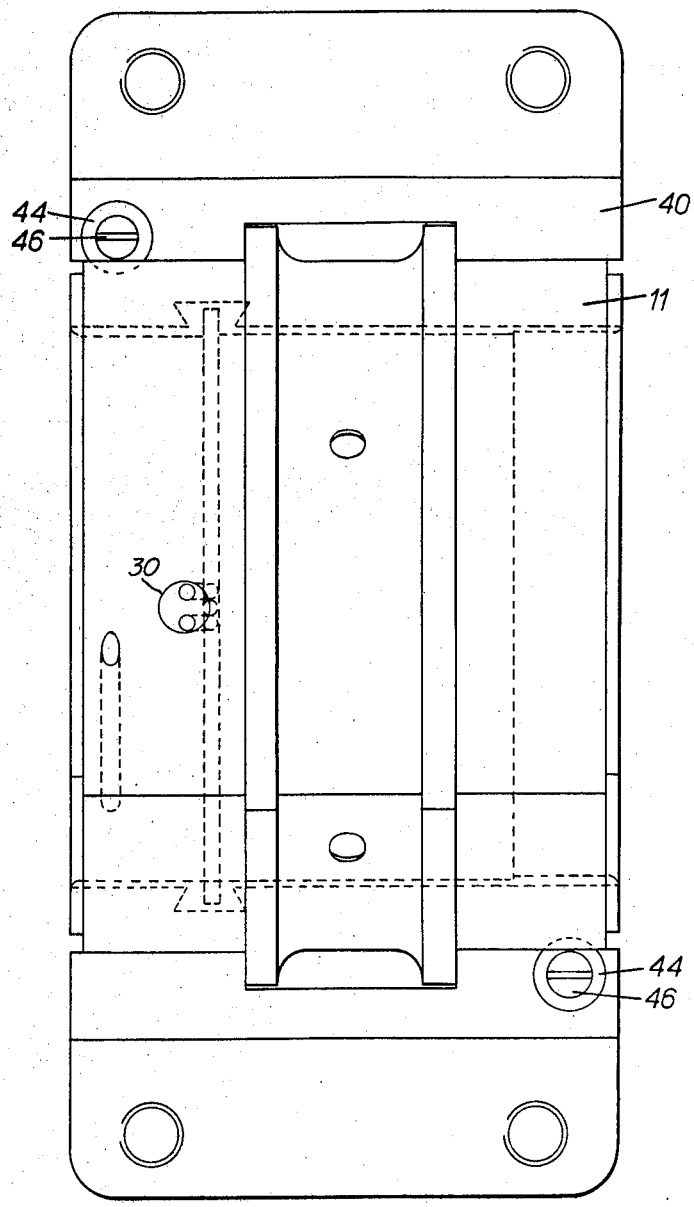

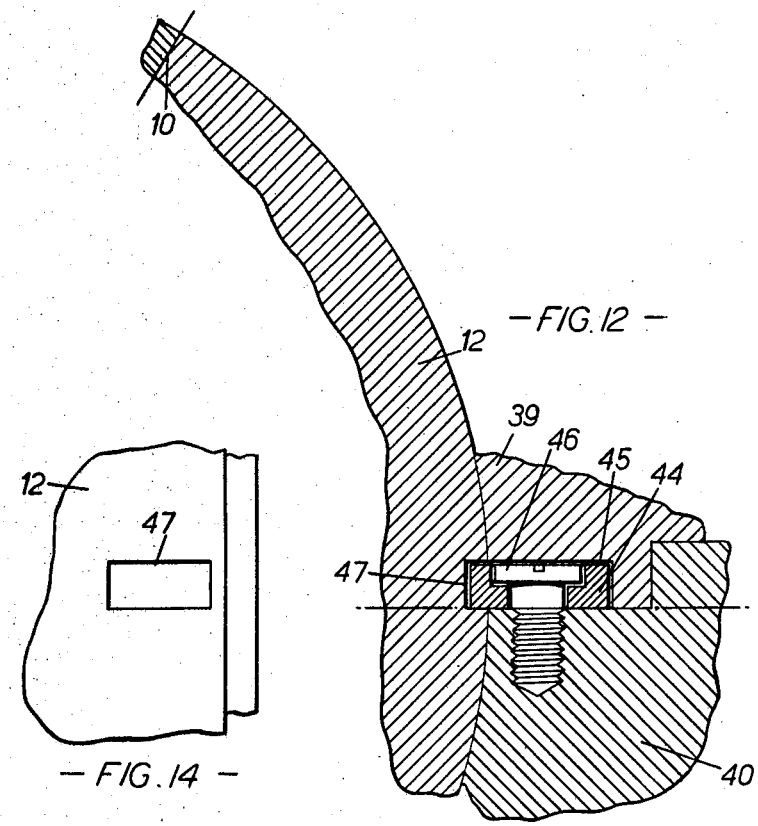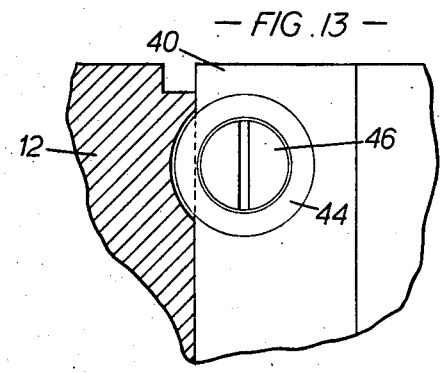

United States Patent Office 3,199,933
Patented Aug. 10, 1965

3,199,933
MACHINE BEARINGS
John Rogerson, Greasby, Wirral, and Harold Curzon Wilding, Willaston, England, assignors to Cammell Laird and Company (Shipbuilders & Engineers) Limited, Shipbuilding & Engineering Works, Birkenhead, England, a company of Great Britain
Filed Oct. 4, 1963, Ser. No. 313,867
Claims priority, application Great Britain, Sept. 27, 1962, 33,090/60
6 Claims. (Cl. 308—121)

This application is a continuation-in-part of application Serial No. 130,809, filed August 11, 1961, now abandoned.

This invention is for improvements in or relating to machine bearings.

The invention is particularly, although not exclusively, applicable to bearings for turbines and their associated gears, and ships' propeller shafts. These are only mentioned, however, as typical examples of applications of the invention, bearings according to the invention having a wide field of application.

One object of the invention is to provide a restricted clearance bearing which will operate at substantially lower temperatures than conventional bearings and may be designed to operate with shaft clearances as low as, say, 0.0005 inch without diminishing the flow of oil for lubrication and cooling.

A further object of the invention is to provide a restricted clearance bearing having inherent anti-whirl properties which effectively suppress oil llm whirl at high journal speeds.

A still further object of the invention is to provide a restricted clearance bearing which will also serve as a very effective vibration damper and result in reductions in the amplitude of axial vibration of gear pinions particularly in marine installations. Corresponding reductions in noise accompany the reduction in vibration amplitudes.

A still further object of the invention is to provide a restricted clearance bearing in which the closer restriction of the journal makes possible substantial reductions in turbine gland and diaphragm clearances without increasing the hazard of rotor rub. The achievement of this object results in a material reduction in fuel consumption in engines fitted with such bearings.

A still further object of the invention is to provide a restricted clearance bearing in which frictional losses are materially reduced and therefore, in the case of engines fitted with such bearings (e.g. turbines), results in a further material savings of fuel.

A still further object of the invention is to provide a restricted clearance bearing which will ensure a high degree of accuracy of alignment between related rotating elements and thereby ensure minimum fretting and wear on flexible couplings and gear teeth.

Possibly of even greater significance than that of the reduction in the rate of wear of the teeth of flexible couplings is the reduction of mismatch between mating teeth of marine gearing when precession occurs due to a vessel pitching in heavy weather. Two components rotating in opposite directions must precess in opposite directions and consequently the tooth loading in the pair of meshing gears is concentrated alternately at the forward and after ends of the teeth where it may become sufficiently high to induce pitting. The degree of mismatch which can occur between mating helices is controlled by the amount of lateral freedom permitted by the clearance in the bearings and it is essential that this freedom should be restricted as much as possible. Having regard to this a still further object of the present invention is, therefore, to provide a restricted clearance bearing which satisfactorily overcomes the difficulties of obtaining sufficient restraint without restricting the flow of cooling oil.

A necessity for displaced axes arises in bearings for marine or other complex gear cases where several large gears are simultaneously in mesh. In such cases practical difficulty arises in the matter of alignment. It will be appreciated that notwithstanding the excellence of gear hobbing machines there always remains a small error in the gear teeth. Furthermore, there is always some inaccuracy in the boring of the bearing housings in the gear case notwithstanding the care and attention given to this aspect during machining. When erecting such an installation the main wheel or bull gear is placed in position followed by one of the secondary pinions which is placed in dummy bearings made without running clearance. The gears are tested for meshing at this stage and it is one of the features of precision-cut gearing that the high quality surface finish makes the meshing test more revealing. It is generally found as the outcome of this test that some adjustment of alignment is necessary and this is achieved by boring the bearing so that the axis of the bore is displaced with respect to the axis of the outer diameter of the bearing, thus providing an eccentric bearing. The distance between the two axes is the amount necessary to provide the bias required to correct the misalignment. A still further object of the present invention is to provide a restricted clearance bearing in which this adjustment to correct misalignment may be effected.

Still further objects and advantages of the invention will be apparent from the following more detailed description.

It has previously been proposed, see for example Austrian patent specification No. 165,793 of Steller, to provide a bearing with a plurality of separate bearing bushes or sections which are adjustable with respect to one another so as to vary the degree of eccentricity between them. Such a bearing will not achieve the objects set forth above. One reason for this is that it is impracticable to employ a bearing consisting of a number of separate rings or bushes, placed end to end in a housing, because of the difficulty of machining the bore of the housing and the outside diameters of the rings with sufficient accuracy to ensure an equal degree of nip on all of the sections or bushes of the bearing. Inevitably there will exist the possibility that one or more of the sections or bushes will rotate with the shaft. Furthermore, most bearings are split horizontally to permit assembly and this is impracticable with a bearing of the nature just set forth. In this connection the great difficulty, if not impossibility, should be borne in mind of assembling a bearing consisting of six or more semi-circular sections so that its working surfaces are in correct relationship. A still further reason why a bearing as just set forth and as described in Austrian specification No. 165,793 could not achieve the objects of the present invention, as above set forth, is that there is only line contact between each bearing bush or section and the journal. To achieve the above objects it is essential that there should be surface contact between each section of the bearing, in the region of maximum restriction, and the journal.

The present invention achieves the above objects by providing a journal and a restricted clearance bearing therefor, in which said bearing comprises a bushing or lining having a plurality of integrally formed end-to-end bore sections which collectively provide an axial bore or aperture for the journal, each bore section having a part of the circumferential surface area of its bore concentric with and supporting the journal and a part eccentric thereto, said concentric parts defining a zone of restricted clearance and being spaced circumferentially about the axis of the journal as between one bore section and another.

Generally, the bushing or lining will be split longitudinally to facilitate its assembly about the journal.

In some preferred embodiments of the invention concentric parts of the end-to-end bore sections will be spaced equally about the axis of the journal.

Conveniently the concentric part of each bore section, which provides the restricted clearance, has an arcuate length equal to not less than approximately a quarter of the journal diameter.

The invention will be further described, by way of example, with reference to the accompanying drawings wherein:

FIGURES 1, 2, 3 and 4 are diagrammatic views illustrating, in very exaggerated form, the principle of the invention, FIGURE 1 being a longitudinal sectional view of the bearing bush or lining and FIGURES 2, 3 and 4 immediate cross-sections respectively on the lines II—II, III—III and IV—IV of FIGURE 1, FIGURE 5 is a longitudinal sectional view of a practical form of bearing bush or lining according to the invention, FIGURE 6 is a plan view of FIGURE 5, FIGURE 7 is an end view of the bush shown in FIGURES 5 and 6, FIGURE 8 is a diagram illustrating in very exaggerated form the relative positions of the clearances of the bore sections of the bush or lining shown in FIGURES 5, 6 and 7, FIGURE 9 is a longitudinal sectional view showing the bush or lining of FIGURES 5 to 8 fitted into a bearing housing, FIGURE 10 is a cross-section of the bearing and housing shown in FIGURE 11, FIGURE 11 is a plan view of the bearing shown in FIGURE 9 with the top half of the housing removed, and FIGURES 12, 13 and 14 are fragmentary detail views showing a bush or lining locking arrangement incorporated in the bearing shown in FIGURES 9, 10 and 11.

Referring first to FIGURES 5 to 8 of the drawings, it will be noted that the bearing bush or lining is split at 10 into two semi-circular parts 11 and 12 and has integrally formed end-to-end bore sections 13, 14 and 15 which collectively provide an axial bore for the journal 16, each bore section has a part 17 of the circumferential surface of its bore concentric with the journal and a part 19 eccentric thereto, the eccentric parts being spaced circumferentially about the axis of the journal as between one bore section and another as indicated in FIGURES 2, 3 and 4. In this particular example the surfaces 17 which are concentric with the journal are spaced 120° about the axis of the journal as between one bore and its neighbour. It will be appreciated that the arcuate areas 17 present substantial surfaces to the journal and thereby prevent a high concentration of pressure on the bearing material particularly when the journal is heavily loaded.

FIGURES 5–8 show a bearing shell or liner which is a practical embodiment of the liner shown diagrammatically in FIGURES 1 to 4 and where applicable, like reference numerals have been used to designate like parts. It is not possible in FIGURE 7 to distinguish between the concentric and eccentric surfaces of the bore sections, because of the small scale, but the construction will be clearly understood by reference to FIGURE 8 which shows these surfaces in very exaggerated form.

Each half 11, 12 of the shell has a white metal or similar lining 21 and the shell is formed with flanges or annular shoulders 22 and 23 and with a reference shoulder 24 for a purpose hereinafter to be described. An oil inlet 25 is provided in the centre section 14 of the bearing shell and oil inlets from the centre section 14 to the end sections 13 and 15 respectively are provided by ducts 26 and 27. An oil groove 28 is also provided in the white metal lining. A dam 29 (see FIGURE 7) is fitted in the oil groove to deflect oil into a connection 30 in either direction of rotation and thereby to a thermometer pocket to enable the temperature of the lubricating oil to be taken as and when required.

The two halves of the shell are located together by means of dowels 31 and 32. Toggle holes 33 are provided in the shell for engagement by a suitable tool when it is required to adjust the shell in its housing.

In FIGURE 8 the reference numerals 33, 34 and 35 indicate the centres of sections 13, 14 and 15 respectively and the circle 36 indicates the radius of eccentricity. The reference numerals 10 and 38 indicate respectively the joint or split of the bearing and the joint of the bearing housing or gear case. It will be noted, in this particular example, that there is an angle of 58° between the joint of the bearing and the joint of the gear case or housing.

It will also be noted from FIGURE 8 that the oil inlets 25, 26 and 27 are spaced 120° apart about the axis of the journal.

Referring now to FIGURES 9 to 14, these show the bearing shell illustrated in FIGURES 5 to 8 positioned in its housing which comprises a top half 39 and a bottom half 40 which encompass the bearing shell and are bolted together by means of bolts or studs inserted in the holes 41. The housing parts 39 and 40 have a circumferential recess 42 which mates with the flanges 22 and 23 on the shell so as to locate the latter in position and hold it against axial movement.

The top half 39 has an oil inlet connection 43 which registers with the oil inlet duct 25′ in the shell, and a thermometer connection 43′ which registers with the thermometer connection 30 of the shell.

An important feature of the arrangement shown in FIGURES 13 to 18 is the provision of locking means for positively holding the bearing shell parts against angular movement in the bearing housing. Each of these arrangements comprises a check washer 44 housed in a recess 45 in the top half 39 of the bearing housing and secured to the lower half 40 of the housing by means of a locking screw 46. The check washer 44 has a part which projects into a recess 47 in the neighbouring half of the bearing shell.

A convenient process for the manufacture of a restricted clearance bearing as above described contemplates mounting the shell in a jig plate secured on the face plate of a lathe, and firstly, the shell is bored centrally from end to end to a diameter equal to the shaft or journal diameter plus the restricted clearance. This restricted clearance is made as small as possible and is normally about 0.005 inch.

The jig plate is then re-positioned on the face plate of the lathe to place its axis eccentric with respect to the axis of the lathe face plate by an amount equal to that required to produce the required major clearance in the bore. The bearing shell is turned and fastened in the jig plate in the proper position for boring the eccentric portion of one section. When this boring operation on section 15, for example, has been completed the bearing shell is turned through an angle of 120° and the boring out of the eccentric portion of section 14 of the shell to the maximum clearance is then effected. Finally, the bearing shell is turned through a further angle of 120° and boring out of section 13 to the maximum clearance is effected.

It will be appreciated that the major clearances are machined so as to leave an arc $a$ (see FIGURE 4) of the restricted clearance bore $d$ untouched.

During the boring operations both halves of the bearing shell may be held together by means of a clip or a chain and toggle, the whole assembly being located by the locating diameter of the hole provided in the jig plate for the end of the complete bearing shell.

The arrangements above described may be modified in the case of slope boring of bearings such as is adopted to take care of propeller shaft deflections and deflections of similar journals of a very heavy nature which have to be supported between bearings.

A further advantage of the bearing bush or lining construction above described is that it makes it possible to increase the diameter of the clearance circle without producing a corresponding increase in the Hertzian (surface) stress.

We claim:

1. A restricted clearance bearing for a journal, comprising a bushing formed of at least three integral end-to-end sections which collectively define an axial bore, each of said sections having its bore surface shaped to include a cylindrical journal support segment smaller than a semicylinder substantially concentric with the axis of said bore and a clearance segment larger than a semicylinder eccentric to the bore axis, and said journal support segment of each section being spaced circumferentially with respect to the journal support segments of the other sections and collectively defining a zone of restricted journal clearance for a thin load-carrying oil film fed from said eccentric clearance segments, whereby to provide rigidly connected and relatively fixed bushing sections that adequately lubricate, cool and dampen vibrations of a supported journal.

2. A restricted clearance bearing according to claim 1 wherein said journal support segments of said sections are symmetrically spaced circumferentially about the bore of the bushing.

3. A restricted clearance bearing according to claim 1 wherein a port for lubrication is provided in the clearance segment of at least one of said sections.

4. A restricted clearance bearing according to claim 1 wherein said bushing is split diametrically to provide two mated half linings.

5. A restricted clearance bearing according to claim 4 in combination with a housing for said half-linings, said housing comprising two half-parts mated together and embracing the half-linings, the mating faces of the half-linings being displaced angularly, with respect to the mating faces of the halves of the housing.

6. A restricted clearance bearing according to claim 1 in combination with a housing for said bushing and interengaging means between the bushing and the housing operative to lock the bushing against rotation in the housing.

References Cited by the Examiner

UNITED STATES PATENTS

| 73,183 | 1/68 | Henfield | 308—237 |
| 1,154,650 | 9/15 | Moore | 308—237 |
| 1,236,511 | 8/17 | Waring | 308—240 |
| 2,134,621 | 10/38 | Persarese | 308—121 |

FOREIGN PATENTS 165,793    10/49    Austria.

ROBERT C. RIORDON, *Primary Examiner.*

FRANK SUSKO, *Examiner.*